(12) United States Patent
Wenger et al.

(10) Patent No.: US 9,035,255 B2
(45) Date of Patent: May 19, 2015

(54) CALIBRATION OF A LEVEL GAUGE SYSTEM

(75) Inventors: Fabian Wenger, Göteborg (SE); Mats Nordlund, Mölndal (SE); Lennart Hägg, Kungsbacka (SE)

(73) Assignee: Rosemont Tank Radar AB, Gothenburg (SE)

( * ) Notice: Subject to any disclaimer, the term of this patent is extended or adjusted under 35 U.S.C. 154(b) by 715 days.

(21) Appl. No.: 13/238,437

(22) Filed: Sep. 21, 2011

(65) Prior Publication Data
US 2013/0069795 A1   Mar. 21, 2013

(51) Int. Cl.
*G01F 23/284*    (2006.01)
*G01F 25/00*    (2006.01)

(52) U.S. Cl.
CPC .......... *G01F 23/284* (2013.01); *G01F 25/0061* (2013.01)

(58) Field of Classification Search
CPC .... G01N 21/3504; G01N 21/05; G01N 21/31
USPC .............................................. 250/343, 252.1
See application file for complete search history.

(56) References Cited

U.S. PATENT DOCUMENTS

| | | | |
|---|---|---|---|
| 5,609,059 A * | 3/1997 | McEwan ..................... 73/290 R |
| 5,651,286 A | 7/1997 | Champion et al. .............. 73/290 |
| 6,087,978 A | 7/2000 | Lalla et al. |
| 6,122,602 A | 9/2000 | Michalski et al. |
| 6,509,864 B1 | 1/2003 | Mende et al. |
| 7,619,558 B2 * | 11/2009 | Griessbaum ................... 342/124 |
| 7,962,100 B2 * | 6/2011 | Isenmann et al. .......... 455/67.11 |
| 8,321,155 B2 * | 11/2012 | Rauer et al. ...................... 702/23 |
| 2004/0004905 A1 | 1/2004 | Lyon et al. ...................... 367/13 |
| 2009/0288482 A1 * | 11/2009 | Faist ........................... 73/290 R |

(Continued)

FOREIGN PATENT DOCUMENTS

| | | |
|---|---|---|
| EP | 1 770 409 A1 | 4/2007 |
| GB | 2 472 085 A | 1/2011 |

OTHER PUBLICATIONS

International Search Report and Written Opinion for PCT application No. PCT/EP2011/066700, dated Oct. 31, 2012, 9 pages.

(Continued)

*Primary Examiner* — Christine Sung
(74) *Attorney, Agent, or Firm* — Westman, Champlin & Koehler, P.A.

(57) ABSTRACT

A method of calibrating a level gauge system using electromagnetic signals to determine a filling level of a product in a tank. The level gauge system comprises a real time sampler for sampling a reflection signal with a sampling period between consecutive samples. The method comprises the steps of: receiving timing signals from a wireless communication network; generating time stamp signals based on the timing signals; registering a number of the sampling periods between a first time stamp signal and a second time stamp signal; and determining the sampling period based on the registered number of sampling periods and a time between the first time stamp signal and the second time stamp signal. Various embodiments of the present invention provide for high accurate determination of the filling level in a tank without the need for a temperature stable and highly accurate clock reference in the level gauge system.

14 Claims, 5 Drawing Sheets

(56) References Cited

U.S. PATENT DOCUMENTS

2012/0010838 A1    1/2012  Wenger et al.
2013/0314273 A1*  11/2013  Kavaler et al. .................. 342/90

OTHER PUBLICATIONS

"Threshold Samplers for UWB Impulse Radar" Hjortland, et al.; Oct. 7, 2009; pp. 1210-1213.

International Search Report from PCT Application No. PCT/EP2011/060288, dated Oct. 13, 2011, 3 pgs.

Written Opinion from PCT Application No. PCT/EP2011/060288, dated Oct. 13, 2011, 6 pgs.

Hjortland, H.A. et al.; "CMOS Impulse Radar," In Proceedings 24th Norchip Conference, 2006, IEEE, pp. 75-79.

* cited by examiner

CALIBRATION OF A LEVEL GAUGE SYSTEM

TECHNICAL FIELD OF THE INVENTION

The present invention relates to calibration of a level gauge system and to a level gauge system with calibration capabilities.

TECHNICAL BACKGROUND

A distance measurement device, or ranging device, is based on the principle that an electromagnetic signal is transmitted towards a surface or an object, and a reflected signal is received. The distance can then be determined based on the time-of-flight of the signal to the surface or object and back. This determination can be performed using suitable signal processing. Ideally, the received signal would simply be sampled in order to detect an echo peak. However, as electromagnetic waves propagate with the speed of light, the echo peak will typically have a duration in the order of only a few nanoseconds. Conventional samplers are not fast enough to capture such a fast pulse with sufficient resolution to detect a distance with high accuracy.

Solutions to this problem are known, for example in the level gauging field. In level gauges employing electromagnetic pulses (here referred to as radar level gauges, RLG, even though the frequencies employed are not necessarily in the conventional radar range) the gauge transmits a pulse train comprising nanosecond pulses with a repetition frequency in the Megahertz range. The reflected pulse train is mixed with the transmitted signal, in order to provide a time expanded pulse response. While providing a satisfactory result, this process requires a complex and relatively expensive design. Efforts have therefore been made to provide real time sampling on a time scale short enough to allow sampling of one, single pulse or as few pulses as possible to map the range of the signal (e.g. 32 pulses for 5-bit resolution).

As one alternative, it has been proposed to use a transceiver module integrated on one silicon chip. Such a module can allow sampling in real time of a pulse with a time duration in the order of ns or less, with a known time relationship between transmitted signal and received signal.

According to one operating principle for such a single chip transceiver module, a received pulse is compared to a threshold level and sampled by a large number (e.g. 128) of successive samplers beginning at a given point in time (strobed sampling) and ending at another point in time, such that the sampling covers a time window typically longer than the pulse itself. By repeating the sampling several times, while gradually increasing (sweeping) the threshold, the amplitude of the received signal can be recovered. This is referred to as "swept threshold sampling" and is described in the article "Thresholded samplers for UWB impulse radar" by Hjortland et al. An example of a radar chip based on this principle is commercially available from Novelda in Norway.

A potential problem with sampling a signal in real time using a series of on-chip elements is the absence of a temperature-stable clock reference. Although the starting point of sampling can be established e.g. with a reference echo, the exact duration of the sampling will depend on the delay components on the chip. For example, the transceiver module may exhibit a large temperature drift, since all delay elements in the chip possess pronounced temperature dependence. In laboratory measurements an uncompensated temperature drift in the order of 4 cm per 10° C. has been observed. This problem is particularly relevant for radar level gauging implementations.

SUMMARY OF THE INVENTION

It is a general object of the present invention to overcome or at least mitigate the above mentioned problem of real time sampling transceiver modules.

According to a first aspect of the present invention, it is provided a level gauge system, for determination of a filling level of a product in a tank using electromagnetic signals, the level gauge system comprising: a signal propagation device, for transmitting a pulsed measuring signal into the tank, and receiving a reflection signal from the tank; a transceiver module having a pulse generator for providing the pulsed measuring signal to the signal propagation device, and a real time sampler for sampling the reflection signal with a sampling period between consecutive samples to provide a sampled reflection signal; processing circuitry, connected to receive the sampled reflection signal from the transceiver module and configured to determine the filling level based on the sampled reflection signal and the sampling period; and a wireless communication device connected to the processing circuitry for providing a wireless communication signal indicative of the filling level to a remote location via a wireless communication network, the wireless communication device being configured to receive timing signals via the wireless communication network and to provide timing information based on the timing signals, wherein the level gauge system further comprises calibration circuitry arranged to receive time stamp signals being based on the timing information, and configured to register a number of sampling periods between a first time stamp signal and a second time stamp signal, and wherein the processing circuitry is further configured to estimate the sampling period of the real time sampler based on the time between the first time stamp signal and the second time stamp signal, and the number of sampling periods registered by the calibration circuitry.

The tank may be any container or vessel capable of containing a product, and may be metallic, or partly or completely non-metallic, open, semi-open, or closed. Furthermore, the filling level of the product contained in the tank may be determined directly by using a signal propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank.

The "signal propagation device" may be any device capable of propagating electromagnetic signals, including transmission line probes, waveguides and various types of antennas, such as horn antennas, array antennas etc.

It should be noted that the processing circuitry may be implemented as one or several microprocessors comprised in the level gauge system. For example, the processing circuitry may comprise one processor for controlling the transceiver module and performing the operations required to determine the filling level and one processor for handling the wireless communication between the level gauge system and the remote location. The remote location may, for example, be a host system at a process control facility.

By real time sampler is here intended a sampler capable of sampling an electromagnetic pulse with a resolution sufficient to make an accurate time determination. In a typical distance measurement application, based on reflection of electromagnetic pulses, this indicates a sample time in the order of nanoseconds or less. As an example, the sampling period can be less than 100 picoseconds, or less than 50 picoseconds. In one embodiment, the sampling period is approximately 30 picoseconds.

The time stamp signals may directly correspond to the timing information provided by the wireless communication device. Alternatively, timing information provided by the wireless communication device may be used to determine a momentarily accurate value of the frequency of an oscillator (such as the system clock) comprised in the level gauge system. The time stamp signals may then be triggered by signals from the system clock (or be signals from the system clock) and may be separated by a given number of clock cycles of the system clock (or other oscillator).

The present invention is based on the realization that the timing synchronization in the wireless communication network can be used to calibrate a level gauge system if time stamp signals are generated based on the wireless communication network timing synchronization, and the number of sampling periods between time stamp signals is registered. From an accurate time and the number of sampling periods, the (average) sampling period can readily be estimated. Using this estimated sampling period, and the sampled reflection signal from the tank, the filling level can be determined with high accuracy without the need for a very accurate and stable clock reference in the level gauge system.

Accordingly, various embodiments of the present invention provide for high accurate determination of the filling level in a tank without the need for a temperature stable and highly accurate clock reference in the level gauge system. As a consequence, the power consumption of the level gauge system can be kept sufficiently low to provide for long time operation of the level gauge system while maintaining the desired measurement accuracy (in the order of mm). In the case of a battery-powered level gauge system, accurate determination of the filling level should be possible to provide for more than 5 years on a single battery pack.

The time stamp signals may be provided from the wireless communication device to the calibration circuitry. Alternatively, the timing information may be provided from the wireless communication device to the processing circuitry, and the processing circuitry may provide time stamp signals to the calibration circuitry based on the timing information.

The real time sampler may comprise a sampling delay line with a plurality of sampling delay elements, a delay of each of the sampling delay elements corresponding to the sampling period. In such a real time sampler, an input signal to be sampled (in this case the reflection signal) is simultaneously provided to a plurality of registers, and a value of the input signal is sampled at different times depending on the progression of a sampling trigger signal passing through the sampling delay line. The time between subsequent sampling events, the sampling period, corresponds to the signal propagation delay of a sampling delay element. The different sampling delay elements may advantageously be made of the same circuit elements, so that the signal propagation delay and the temperature dependence etc. of the sampling delay elements will be substantially equal. In a properly designed sampling delay line, the sampling period can be taken to be the average signal propagation delay of the sampling delay elements in the sampling delay line.

Since the sampling period may be much (several thousand times) shorter than the time between the first time stamp signal and the second time stamp signal, the calibration circuitry may be configured to loop a calibration signal through a calibration delay line comprising a plurality of calibration delay elements for a calibration time period between the first time stamp signal and the second time stamp signal and to register a number of calibration delay elements passed by the signal during the calibration time period.

The calibration delay elements should be such that it is possible to at least approximately derive the average sampling period based on the number of calibration delay elements passed during the calibration time period. To that end, the calibration delay elements should exhibit a signal propagation delay that has substantially the same temperature dependence as the sampling delay elements. The calibration delay elements may therefore advantageously be formed by the same type of circuit elements as the sampling delay elements. Thus, if each sampling delay element is an inverter implemented in a given process, each calibration delay element may advantageously be an inverter (or several inverters) implemented in substantially the same process.

In various embodiments, at least some of the sampling delay elements may be used as calibration delay elements, so that the calibration delay line is formed by at least a portion of the sampling delay line. For example, the entire sampling delay line may be used as calibration delay line.

In cases where the calibration delay elements are not identical to the sampling delay elements, but the relationship between the signal propagation delay of a calibration delay element and a sampling delay element is known, the number of sampling periods may be indirectly registered in units of an average signal propagation delay of the calibration delay elements. When the calibration delay elements are identical to the sampling delay elements (such as when the sampling delay elements are used as calibration delay elements), the number of sampling periods may instead be directly registered in units of an average signal propagation delay of the sampling delay elements.

In various embodiments, the calibration circuitry may comprise a counter for counting how many times the calibration signal passes through the calibration delay line during the calibration time period. This will give an indication of the number of calibration delay elements passed by the calibration signal during the calibration time period. Depending on the length of the calibration time period in relation to the signal propagation delay of the calibration delay elements, the average sampling period may be possible to deduce with sufficient accuracy from the number of passes of the calibration signal (=the value registered by the counter) through the calibration delay line.

Whether or not this is possible will also depend on the number of calibration delay elements in the calibration delay line. If the calibration delay line is short (few calibration delay elements) the error introduced by not taking into account calibration delay elements passed/not passed by the calibration signal in the final loop will of course be smaller than if the calibration delay line is long.

The calibration circuitry may further comprise a plurality of registers, each being connected to the calibration delay line between calibration delay element, and being arranged to be triggered by the second time stamp signal.

By reading the registers, it can be determined how far the calibration signal has propagated in the final loop through the calibration delay line. The total number of calibration delay elements passed during the calibration time period can then be determined using the relation:

$$M = N \times CNT\ VALUE + n,$$

where M is the total number of calibration delay elements passed, N is the number of calibration delay elements in the calibration delay line, CNT VALUE is the counter value indicating the number of times the calibration signal has been looped through the calibration delay line, n is the number of activated registers at the end of the calibration time period.

As was described above, the timing information provided by the wireless communication device may be used to determine a momentarily accurate frequency of an internal oscillator, such as the system clock for the level gauge system.

As an alternative to counting the number of loops through a calibration delay line etc, a signal from the internal oscillator may be provided as an input signal to the real time sampler. Since a momentarily accurate frequency of the internal oscillator is known, the sampling period can be determined by correlating the sampled signal with the known input signal. Methods for calibrating a radar level gauge system based on an input signal having a known (and accurate) frequency are described in Applicant's pending application Ser. No. 12/833,187, which is hereby incorporated by reference in its entirety.

According to various embodiments, the wireless communication device may be configured to communicate according to a TDMA (Time Division Multiple Access) scheme. For example, the wireless communication device may follow the WirelessHART standard (IEC 62591).

Furthermore, the level gauge system may advantageously be configured to be powered by a local power source, which may, for example, comprise a battery, a super capacitor, a wind turbine, and/or solar cells etc.

Accordingly, the level gauge system may advantageously comprise a local energy storing device for providing energy for operation of the level gauge system. The local energy storing device may be any device capable of storing energy, such as, for example, one or several batteries, one or several capacitors, etc.

According to a second aspect of the present invention, there is provided a method of calibrating a level gauge system using electromagnetic signals to determine a filling level of a product in a tank, the level gauge system comprising a real time sampler for sampling a reflection signal with a sampling period between consecutive samples, the method comprising the steps of: receiving timing signals from a wireless communication network; generating time stamp signals based on the timing signals; registering a number of the sampling periods between a first time stamp signal and a second time stamp signal; and determining the sampling period based on the registered number of sampling periods and a time between the first time stamp signal and the second time stamp signal.

According to an embodiment of the method, the real time sampler may comprise a sampling delay line with a plurality of sampling delay elements, a delay of each of the sampling delay elements corresponding to the sampling period, and the step of registering a number of the sampling periods may comprise the steps of: looping a calibration signal through a calibration delay line comprising a plurality of calibration delay elements for a calibration time period between the first time stamp signal and the second time stamp signal; counting a number of times the calibration signal passes through the calibration delay line during the calibration time period; and registering which calibration delay elements the calibration signal has passed through on its last run through the calibration delay line.

Further embodiments of, and effects obtained through this second aspect of the present invention are largely analogous to those described above for the first aspect of the invention.

Through the various embodiments of the level gauge system and method according to the present invention, the level measurement and the calibration may be performed consecutively or in parallel. In the latter case, and in embodiments where the calibration signal is allowed to pass through the sampling delay line, the two input signals (pulse reflection and calibration signal) may be separated from each other by amplitude or frequency.

It is noted that the invention relates to all possible combinations of features recited in the claims.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

The present invention will herein be described with reference to a level gauge device of the so-called GWR (Guide Wave Radar) type in which the electromagnetic signals are guided back and forth between the measuring unit of the level gauge and the product to be gauged by a transmission line probe. However, this is by no means to be considered a limitation of the present invention, which may also advantageously be used for non-contact level gauge systems, in which electromagnetic waves are radiated towards the product in the tank using a radiating antenna.

Figure 1:
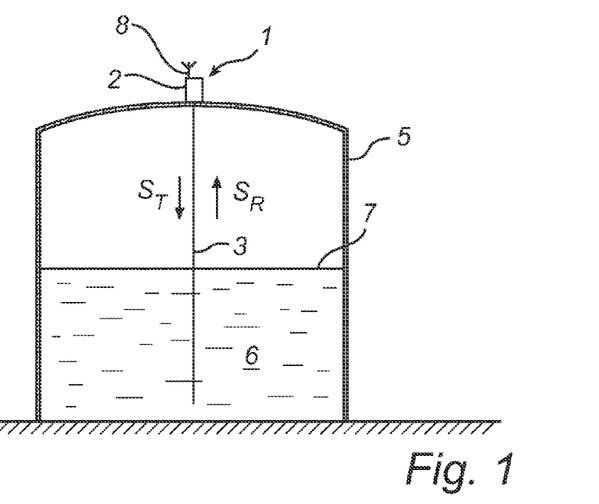
FIG. 1 schematically illustrates a level gauge system according to an embodiment of the present invention installed in an exemplary tank.

FIG. 1 schematically illustrates a level gauge system 1 according to an embodiment of the present invention, comprising a measurement electronics unit 2, and a signal propagation device in the form of a transmission line probe 3. The radar level gauge system 1 is provided on a tank 5, which is partly filled with a product 6 to be gauged. By analyzing a measuring signal $S_T$ being guided by the transmission line probe 3 towards the surface 7 of the product 6, and a reflected signal $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface present in the tank 5 can be measured in a similar manner. The filling level is communicated to a remote location through communication antenna 8.

The transmission line probe 3 can be a coaxial probe, a rigid or flexible twin probe, or a rigid or flexible single probe. A (twin or single) flexible probe is also referred to as a wire probe, while a (twin or single) rigid probe is also referred to as a rod probe. In particular in the case of a flexible probe, the lower end of the probe can be attached in the bottom of the tank, or attached to a weight that ensures that the end of the probe remains in the bottom of the tank.

Figure 2:
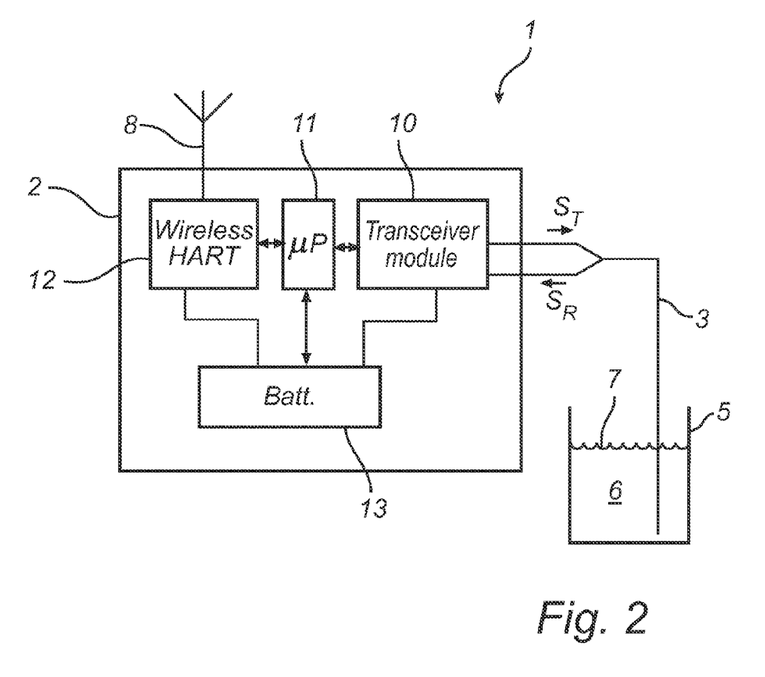
FIG. 2 is a schematic block diagram of the level gauge system in FIG. 1.

As is schematically illustrated in FIG. 2, the level gauge system 1 comprises a transceiver module 10, processing circuitry, here in the form of a microprocessor 11, a wireless communication device 12 and a battery pack 13.

In operation, the transceiver module 10 generates a pulsed electromagnetic measuring signal $S_T$ and receives a reflected signal $S_R$. The transceiver module 10, which will be described in more detail below, provides data from which the filling level can be determined to the microprocessor 11.

The microprocessor 11 determines the filling level, and/or another process parameter, and provides this information to a remote location via the wireless communication device 12, which may advantageously be compliant with WirelessHART (IEC 62591).

The microprocessor may also receive various commands via the wireless communication device 12 and may control or calibrate the transceiver module in response to such commands_ In particular, the microprocessor may receive wake-up signals via the wireless communication device 12, perform a measurement operation (which may include a calibration operation), report the determined filling level and then go back to sleep. This kind of intermittent operation is an important factor for achieving autonomous operation for a long time without user intervention.

The transceiver module 10, the microprocessor 11 and the wireless communication device 12 are all supplied with energy from a local energy storing device, such as a battery 13 and/or a capacitor etc. The level gauge system 1 may additionally comprise one or several energy harvesting devices, such as solar cells, a wind turbine, piezoelectric actuators etc.

Figure 3:
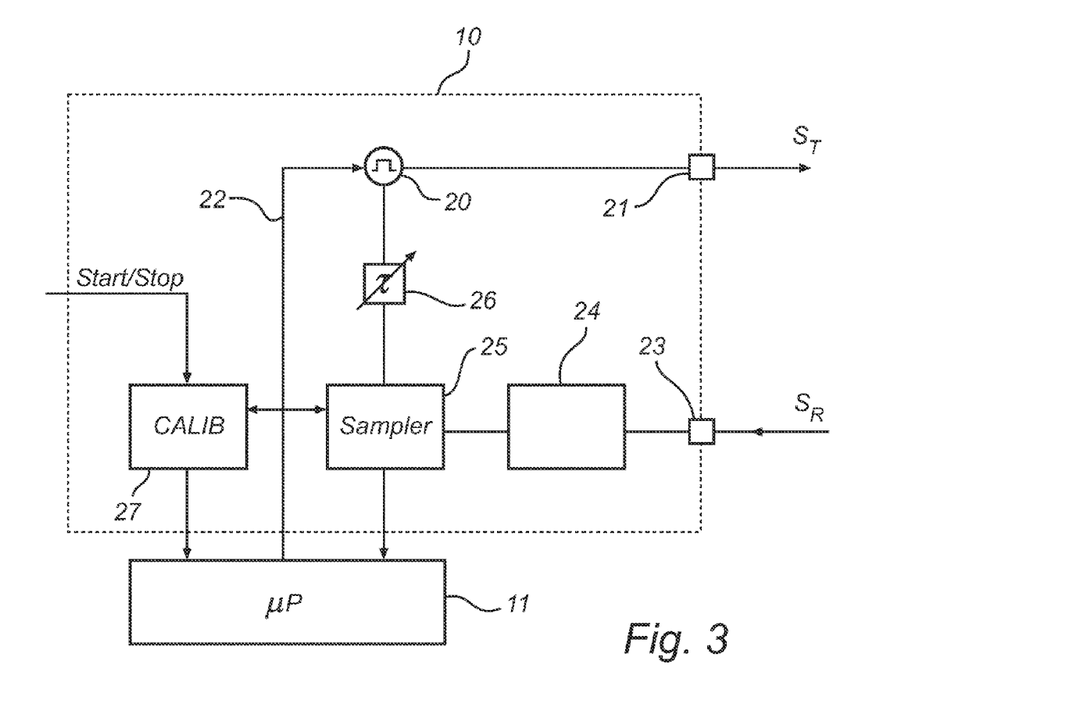
FIG. 3 is a schematic block diagram of the transceiver module comprised in the level gauge system in FIG. 2.

FIG. 3 shows a more detailed block diagram of the transceiver module 10 in FIG. 1. The transceiver module 10 here comprises a transmitter part, a receiver part and a calibration part integrated on a single chip. A single chip design may be achieved by integration on a single silicon die, or on multiple silicon dies integrated in a single, mountable component.

It should be noted that the calibration circuitry need not necessarily be a part of the transceiver module 10, but may be provided as a separate component.

The transmitter part includes a pulse generator 20 arranged to generate and transmit pulses having a desired frequency and pulse shape. The pulse generator 20 is connected to the signal propagation device 3 via an output terminal 21. The repetition frequency of the pulse generator is governed by an external clock signal 22, e.g. received from the microprocessor 11. As an example, the center frequency of the pulses can be 3.4 GHz, and the repetition frequency can be in the range 1-100 MHz, e.g. 90 MHz. The duration of each pulse may be in the order of nanoseconds.

The receiver part includes an input terminal 23 connected to an amplifier 24 arranged to amplify a signal received at the input terminal 23. The receiver part further includes a real time sampler 25 arranged to sample the received signal in real time. In the context of radar level gauging, real time sampling indicates a resolution in the order of picoseconds. The sampler 25 is connected to the pulse generator 20 via a time delay unit 26, and is arranged to begin sampling of the received signal a preset delay $\tau$ after the time of emission of a measuring pulse by the pulse generator 20.

The transceiver module 10 in FIG. 3 further comprises calibration circuitry 27 for calibrating the real time sampler 25 using time stamp signals (indicated by "Start/Stop" in FIG. 3) that have been formed based on timing information obtained from the wireless communication network via the wireless communication device 12 (see FIG. 2). One example embodiment of the calibration circuitry 27 will be described in more detail further below with reference to FIG. 5.

According to one embodiment, the sampler 25 may be arranged to operate according to the "swept threshold sampling" principle described in "Thresholded samplers for UWB impulse radar" by Hjortland et al., herewith incorporated by reference. According to this approach, the received signal is compared with a threshold, and the unclocked output is sampled by an array of inverter stages. An exemplary configuration of the transmitter and receiver parts of the transceiver module 10 for swept threshold sampling will now be described with reference to FIG. 4, which shows the real time sampler 25 of FIG. 3 in more detail.

Figure 4:
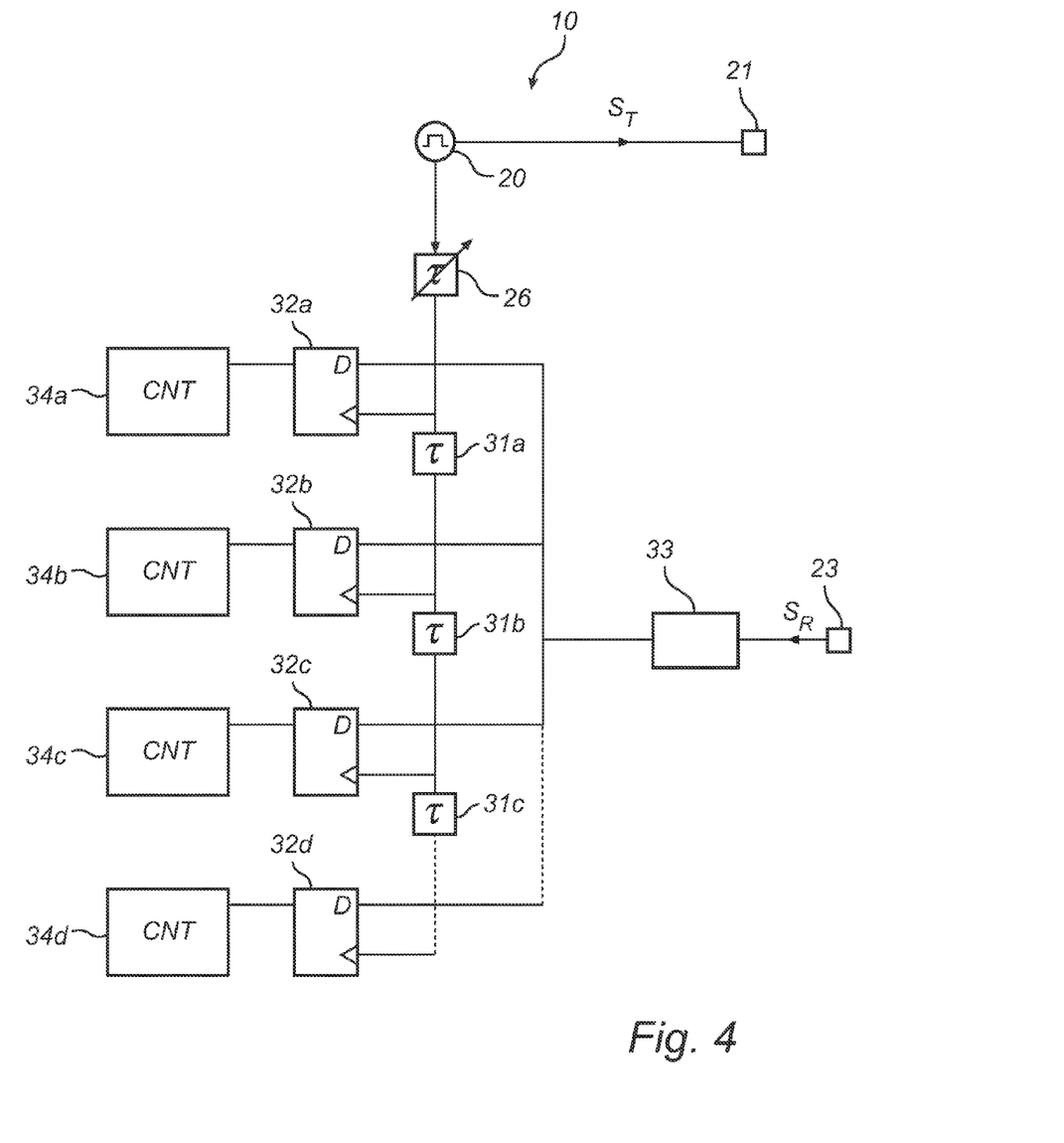
FIG. 4 illustrates an exemplary embodiment of the transmitter and receiver parts of the transceiver module in FIG. 3.

As can be seen in FIG. 4, the real time sampler 25 comprises a sampling delay line 30 formed by a plurality of sampling delay elements 31a-c arranged in series. Between the delay elements 31a-c, the sampling delay line 30 is connected to a series of digital registers, here provided in the form of D flip-flops 32a-d. The D flip-flops 32a-d are also connected, at the D-input, to the input terminal 23 via thresholding circuitry 33. The output of each of the D flip-flops 32a-d is connected to a respective counter 34a-d.

Through the propagation delay along the sampling delay line 30, the D flip-flops 32a-d will be triggered at different times by the delayed measuring pulse that originates from the pulse generator and is traveling along the sampling delay line 30. Accordingly, the signal at the D-inputs of the D flip-flops 32a-d will be sampled at different times, with the time between consecutive samples—the sampling period—corresponding to the signal propagation delay of a delay element 31a-c.

In swept threshold sampling, the input signal (in this case the reflected signal $S_R$) is compared to a threshold value in the thresholding circuitry 34. If/when the input signal $S_R$ is higher than the threshold value, the output from the thresholding circuitry 34 is "high", and when the input signal $S_R$ is lower than the threshold value, the output is "low". If the output is "high" when sampled at the D flip-flops 32a-d, a "1" will be provided to the counter from that D flip-flop 32a-d. In other words, a binary sequence will be provided.

The sampling is repeated several times, while gradually increasing (sweeping) the threshold, thereby resulting in a plurality of binary sequences. These binary sequences are combined to produce a digitally sampled signal, having a resolution (in terms of signal amplitude) that corresponds to the number of sampling repetitions plus one.

The sampling delay line 30 may, for example, comprise 128 sampling delay elements, each formed by one (or several) inverter stage(s). In this case, a binary sequence of 128 bits will be formed. If only one sampling is performed, the resolution (in terms of signal amplitude) will be 2 (high or low). If 511 samplings are performed, the resolution will be 512, or $2^9$. The sampler can optionally be arranged to acquire repeated sample sequences and to average the result, in order to reduce the effect of noise.

The effective sampling-rate (the resolution in terms of time) will be inversely proportional to the propagation delay of a single sampling delay element. As an example, if the propagation delay of one sampling delay elements (such as for example one inverter stage) is about 30 ps, the sampling rate will be close to 35 GS/s. As electromagnetic waves travel at a speed of 0.3 mm/ps in vacuum, the spatial resolution of the sampler would then be around 9 mm if a one-way delay is measured, or 4.5 mm if a two-way delay is measured.

The delay of each CMOS inverter stage will depend on a number of factors, including process (random and systematic deviations from a nominal design delay of the manufactured CMOS chip), supply voltage, and temperature. In the example mentioned above, the delay of one inverter stage will thus not be constant, but may vary within a given range.

As should be clear from the above explanation, it is important to be able to accurately determine the actual signal propagation delay (or at least the actual average signal propagation delay) of the sampling delay elements 31a-c. Since the signal propagation delay of the sampling delay elements will typically vary with temperature etc, only an initial calibration during production or upon installation is not likely to be sufficient in applications where a high accuracy filling level determination is desired.

An example implementation of the calibration circuitry 27 in FIG. 3 will now be described with reference to FIG. 5.

Figure 5:
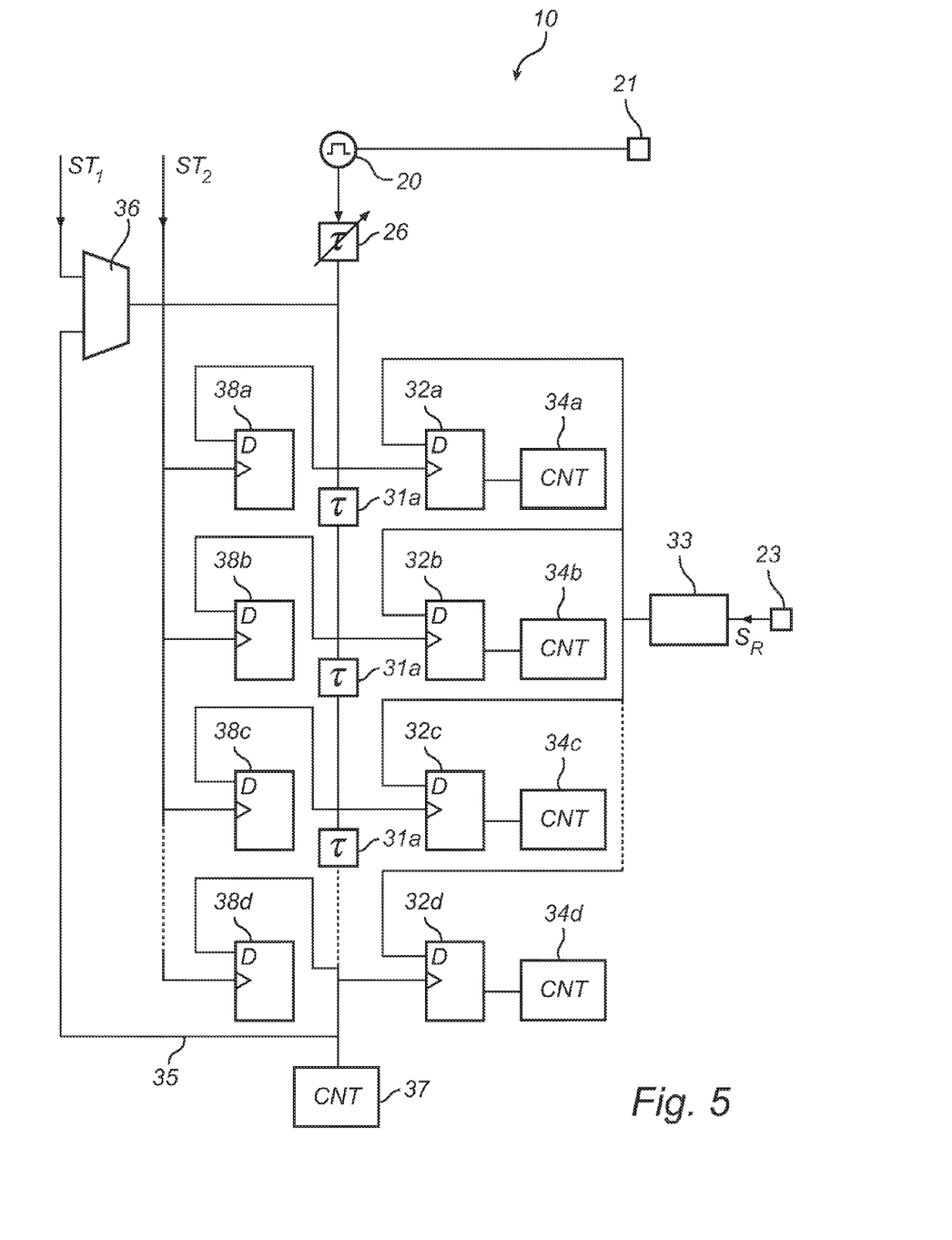
FIG. 5 illustrates an exemplary embodiment of the transceiver module in FIG. 3 also including calibration circuitry.

FIG. 5 illustrates an embodiment of the transceiver module 10 in FIG. 3 comprising the swept threshold sampling architecture described above with reference to FIG. 4 and calibration circuitry.

The calibration circuitry comprises a calibration delay line, which in this embodiment is the same as the sampling delay line 30, a calibration loop 35, a multiplexer 36 and a counter 37. In addition, the calibration circuitry comprises a set of digital registers, such as D flip-flops 38a-d, with the D-inputs being connected to the sampling delay line 30 between the sampling delay elements 31a-c.

The counter 37 will count the number of times the first time stamp signal $ST_1$ that is introduced into the loop 35 through the multiplexer 36 passes the calibration delay line (the sampling delay line 30), and the D flip-flops 38a-d will register the position of the first time stamp signal $ST_1$ at the time when the second time stamp signal $ST_2$ triggers the D flip-flops 38a-d. Hereby, the total number of calibration delay elements (in this embodiment the same as sampling delay elements 31a-c) passed by a signal during the calibration time period (the time between $ST_1$ and $ST_2$) can be determined from the value provided by the counter 37 and the data on the outputs of the D flip-flops 38a-d. This will be described further below with reference to the flow-chart in FIG. 6.

Figure 6:
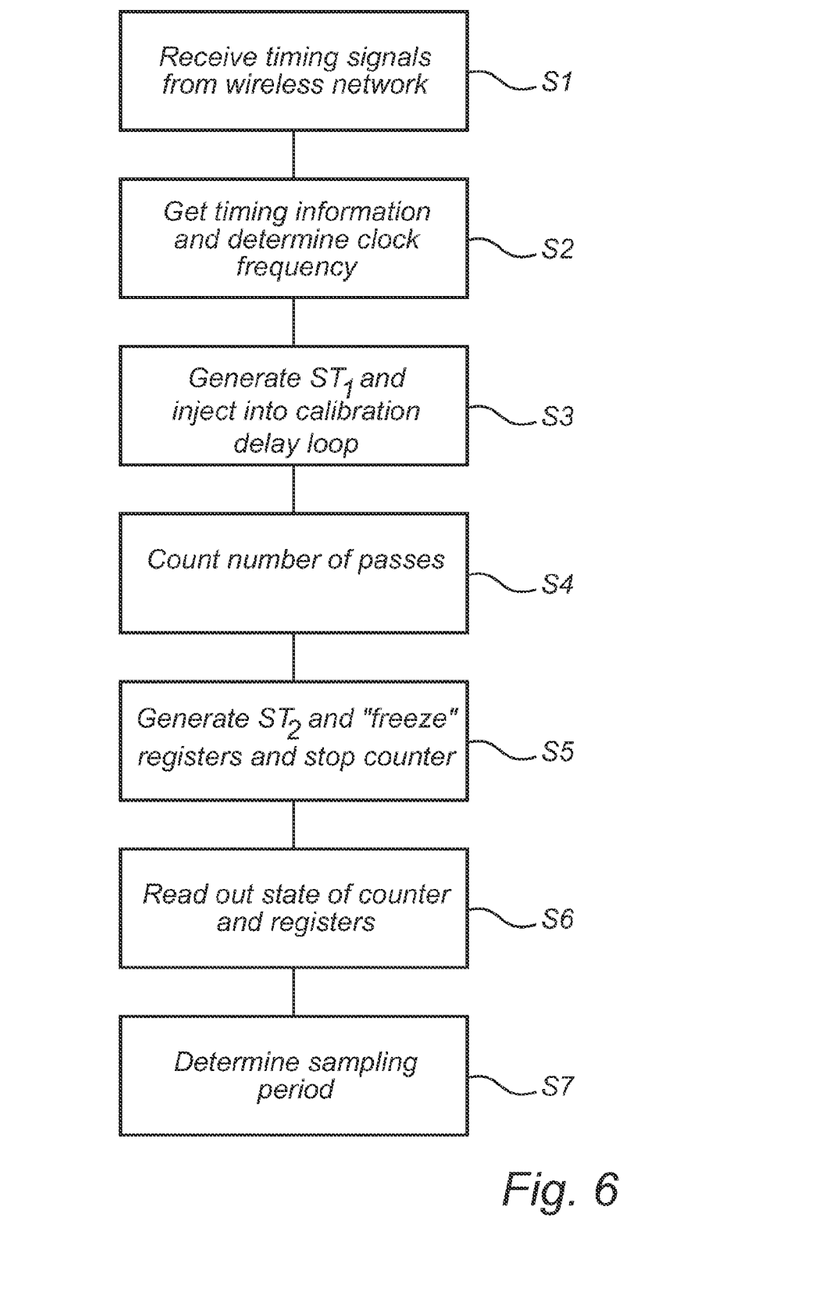
FIG. 6 is a flow chart schematically illustrating an embodiment of the method according to the present invention.

Referring first to FIG. 6 and FIG. 2, timing signals are received from the wireless communication network through the wireless communication device 12 in step S1. In the case when communication over the wireless communication network follows the WirelessHART standard, the network manager regularly sends out timing packets (DLPDU) for network wide synchronization with a timing accuracy of 10 ppm.

In the next step S2, the microprocessor 11 reads out timing information which is based on the timing signals from the wireless communication device 12. The timing information can be accurately accessed from the wireless communication device 12 and read into the microprocessor 11. For example, the wireless communication device 12 may be the wireless mote SMARTMESH® IA-510 M2510 by DUST® Networks (http://www.dustnetworks.com/products/SmartMeshWirelessHART/M2510). From that wireless communication device 12, a Network Time Packet can be read out by activating the TIME pin. Based on the information in two such Network Time Packets (NTPs) (such as two consecutive NTPs), a momentarily accurate cycle time/frequency of the clock of the microprocessor 11 can be determined.

With this knowledge, time stamp signals with a highly accurate interval can be generated based on the microprocessor clock.

A first time stamp signal $ST_1$ is generated and injected into the calibration delay loop 35 in step S3. The number of passes through the calibration delay loop 35 are counted in step S4.

After a suitable time, which may advantageously be substantially longer than the total delay of the calibration delay line, a second time stamp signal $ST_2$ is, in step S5, generated and used to trigger the D flip-flops (or other register elements) 38a-d to "freeze" the progression of the first time stamp signal $ST_1$ at the time of the second time stamp signal $ST_2$.

Subsequently, in step S6, the state of the counter 37 and of the registers 38a-d is read out by the microprocessor 11, and in step S7, the average sampling period is determined by dividing the calibration time period with the number of times the first time stamp signal $ST_1$ passed a delay element.

As an alternative to the procedure described above, the momentarily accurate clock signal (or another suitable signal generated based on the clock signal) may be provided as an input signal to the real time sampler, and the sampled signal may be analyzed to determine the sampling period based on the known clock frequency. This method is described in detail in Applicants pending application Ser. No. 12/833,187.

It is noted that the skilled person will realize that the several modification of the above described embodiment without departing from the inventive concept defined by the claims. For example, the circuit design may include a variety of different components, in addition or instead of the ones illustrated here. Moreover, separate calibration delay elements having similar properties as the sampling delay elements may be used, and conclusions concerning the sampling period may be drawn based on such calibration delay elements.

What is claimed is:

1. A level gauge system, for determination of a filling level of a product in a tank using electromagnetic signals, said level gauge system comprising:
   a signal propagation device, for transmitting a pulsed measuring signal into the tank, and receiving a reflection signal from the tank;
   a transceiver module having a pulse generator for providing said pulsed measuring signal to the signal propagation device, and a real time sampler for sampling said reflection signal with a sampling period between consecutive samples to provide a sampled reflection signal;
   processing circuitry, connected to receive said sampled reflection signal from the transceiver module and configured to determine said filling level based on said sampled reflection signal and said sampling period; and
   a wireless communication device connected to said processing circuitry for providing a wireless communication signal indicative of said filling level to a remote location via a wireless communication network, said wireless communication device being configured to receive timing signals via said wireless communication network and to provide timing information based on said timing signals,
   wherein said level gauge system further comprises calibration circuitry arranged to receive time stamp signals being based on said timing information, and configured to register a number of sampling periods between a first time stamp signal and a second time stamp signal, and
   wherein said processing circuitry is further configured to estimate said sampling period of said real time sampler based on the time between the first time stamp signal and the second time stamp signal, and said number of sampling periods registered by said calibration circuitry.

2. The level gauge system according to claim 1, further comprising a local energy storing device for providing energy for operation of said level gauge system.

3. The level gauge system according to claim 1, wherein said real time sampler comprises a sampling delay line with a plurality of sampling delay elements, a delay of each of said sampling delay elements corresponding to said sampling period.

4. The level gauge system according to claim 3, wherein said calibration circuitry is configured to loop a calibration signal through a calibration delay line comprising a plurality of calibration delay elements for a calibration time period between said first time stamp signal and said second time stamp signal and to register a number of calibration delay elements passed by said signal during said calibration time period.

5. The level gauge system according to claim 4, wherein said calibration delay line is formed by at least a portion of said sampling delay line, such that said sampling delay elements are used as said calibration delay elements.

6. The level gauge system according to claim 4, wherein said calibration circuitry comprises a counter for counting how many times said calibration signal passes through said calibration delay line during said calibration time period.

7. The level gauge system according to claim 6, wherein said calibration circuitry further comprises a plurality of registers, each being connected to the calibration delay line between calibration delay element, and being arranged to be triggered by said second time stamp signal.

8. The level gauge system according to claim 4, wherein said first time stamp signal is used as said calibration signal.

9. The level gauge system according to claim 1, wherein said sampling period of the real time sampler is less than 100 picoseconds.

10. The level gauge system according to claim 1, wherein said pulse generator and said real time sampler are formed on a single integrated circuit component.

11. The level gauge system according to claim 10, wherein calibration circuitry is formed on said single integrated circuit component.

12. The level gauge system according to claim 1, wherein said wireless communication device is configured to communicate according to a TDMA scheme.

13. A method of calibrating a level gauge system using electromagnetic signals to determine a filling level of a product in a tank, said level gauge system comprising a real time sampler for sampling a reflection signal with a sampling period between consecutive samples, the method comprising the steps of:
    receiving timing signals from a wireless communication network;
    generating time stamp signals based on said timing signals;
    registering a number of said sampling periods between a first time stamp signal and a second time stamp signal; and
    determining said sampling period based on the registered number of sampling periods and a time between the first time stamp signal and the second time stamp signal.

14. The method according to claim 13, wherein said real time sampler comprises a sampling delay line with a plurality of sampling delay elements, a delay of each of said sampling delay elements corresponding to said sampling period, and
    wherein said step of registering a number of said sampling periods comprises the steps of:
    looping a calibration signal through a calibration delay line comprising a plurality of calibration delay elements for a calibration time period between said first time stamp signal and said second time stamp signal;
    counting a number of times said calibration signal passes through said calibration delay line during said calibration time period; and
    registering which calibration delay elements said calibration signal has passed through on its last run through said calibration delay line.

* * * * *

UNITED STATES PATENT AND TRADEMARK OFFICE
CERTIFICATE OF CORRECTION

| | | |
|---|---|---|
| PATENT NO. | : 9,035,255 B2 | Page 1 of 1 |
| APPLICATION NO. | : 13/238437 | |
| DATED | : May 19, 2015 | |
| INVENTOR(S) | : Fabian Wenger et al. | |

It is certified that error appears in the above-identified patent and that said Letters Patent is hereby corrected as shown below:

On the title page item (73) Assignee:
        Change "Rosemont Tank Radar AB" to --Rosemount Tank Radar AB--

Signed and Sealed this
Fifteenth Day of December, 2015

Michelle K. Lee
*Director of the United States Patent and Trademark Office*